US006188443B1

(12) United States Patent
Mori et al.

(10) Patent No.: US 6,188,443 B1
(45) Date of Patent: Feb. 13, 2001

(54) IMAGE DISPLAY DEVICE AND INFORMATION PROCESSING APPARATUS ARRANGED TO CONVERT AN ANALOG VIDEO SIGNAL INTO A DIGITAL VIDEO SIGNAL

(75) Inventors: Masashi Mori, Fujisawa; Tatsumi Mori, Isehara; Shigeyuki Nishitani, Yokohama; Hiroshi Kurihara, Mobara; Yukio Hiruta, Fujisawa; Hisayuki Ohhara, Ebina, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/332,895

(22) Filed: Jun. 15, 1999

(30) Foreign Application Priority Data

Jun. 16, 1998 (JP) ........................................ 10-168772

(51) Int. Cl.[7] ........................................ H04N 9/64
(52) U.S. Cl. ........................ 348/572; 348/537; 348/708
(58) Field of Search ............................ 348/572, 573, 348/571, 536, 537, 540, 708; H04N 9/64

(56) References Cited

U.S. PATENT DOCUMENTS 5,677,741 * 10/1997 Yui ...................................... 348/649

FOREIGN PATENT DOCUMENTS 7-160222 6/1995 (JP) .

* cited by examiner

*Primary Examiner*—Sherrie Hsia
(74) *Attorney, Agent, or Firm*—Mattingly, Stanger & Malur, P.C.

(57) ABSTRACT

An image display device is arranged to convert analog video signals into digital video signals and display the corresponding image to the digital video signals. The image display device provides a variable delaying circuit for delaying an analog video signal of each color or a clock variable delay circuit for delaying a dot clock for generating each color dot clock and supplying each color dot clock as a conversion timing signal of an analog-to-digital converting circuit of the corresponding color. This kind of delay circuit is served to adjust a phase of the analog video signal or the dot clock of each color, thereby suppressing color blur even if the analog video signal contains skews among the colors.

24 Claims, 15 Drawing Sheets

HORIZONTAL SYNCHRONIZING SIGNAL 104

DOT CLOCK 109

VIDEO SIGNAL R 101

DOT CLOCK 109

VIDEO SIGNAL R 101

CONVERTING CLOCK R 111

DIGITAL DATA 106
S1
S2'
S2
S3
S4
WAVEFORM A
WAVEFORM B
Ee
DR
DS1
DS2
DS3

FIG.4
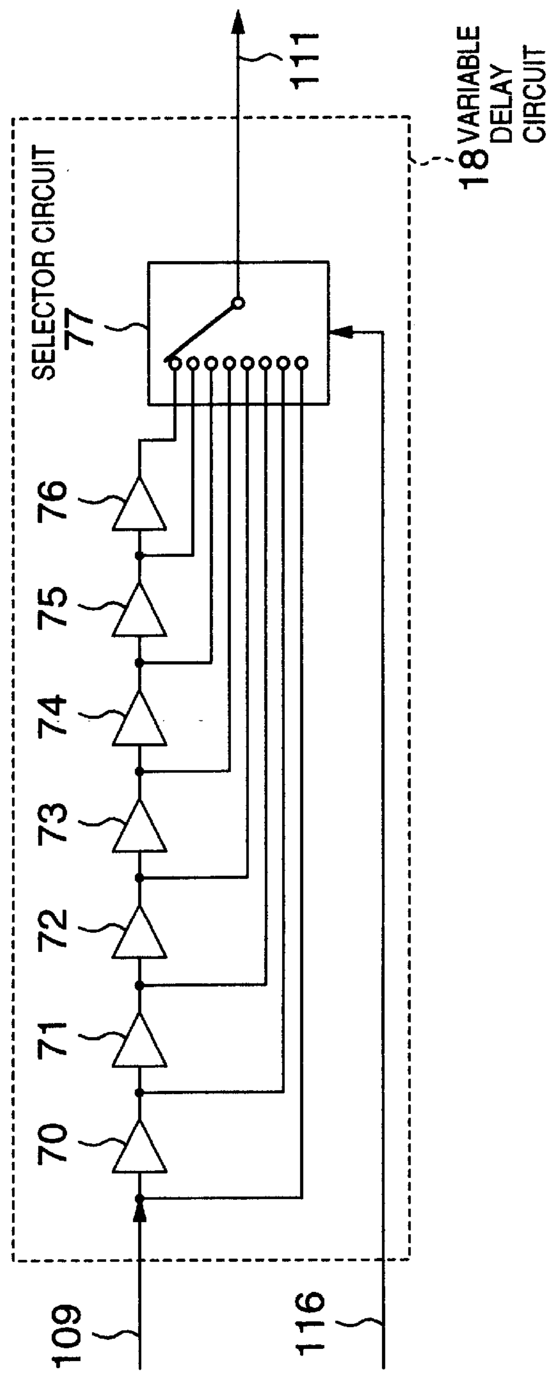
FIG.5A
FIG.5B
FIG.5C
FIG.5D
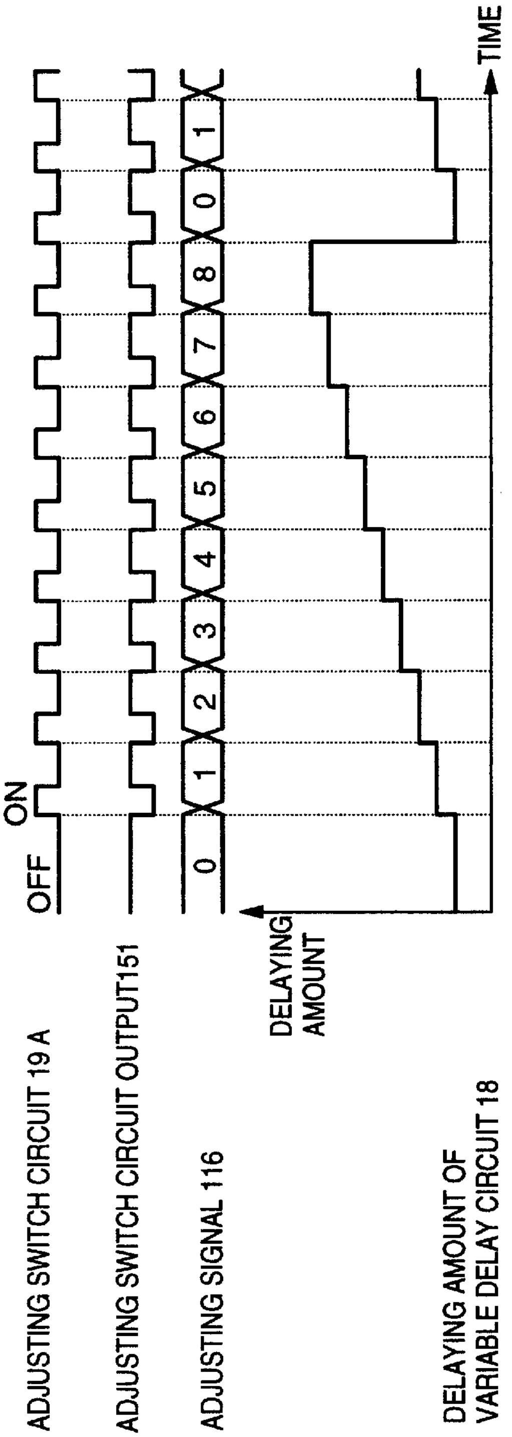

HORIZONTAL SYNCHRONIZING SIGNAL 104

DELAYED HORIZONTAL SYNCHRONIZING SIGNAL 150

DOT CLOCK 109

VIDEO SIGNAL R 101

VIDEO SIGNAL G 102

VIDEO SIGNAL B 103

CONVERTING CLOCK R 111

CONVERTING CLOCK G 112

CONVERTING CLOCK B 113
D2
SR
SG
SB
DR
DG
DB

FIG.10A HORIZONTAL SYNCHRONIZING SIGNAL 104

FIG.10B DOT CLOCK 109

FIG.10C VIDEO SIGNAL R 101

FIG.10D VIDEO SIGNAL R 101

FIG.10E VIDEO SIGNAL G 102

FIG.10F VIDEO SIGNAL B 103

FIG.10G DELAYED VIDEO SIGNAL R 131

FIG.10H DELAYED VIDEO SIGNAL G 132

FIG.10I DELAYED VIDEO SIGNAL B 133

FIG.10J DOT CLOCK 109

IMAGE DISPLAY DEVICE AND INFORMATION PROCESSING APPARATUS ARRANGED TO CONVERT AN ANALOG VIDEO SIGNAL INTO A DIGITAL VIDEO SIGNAL

CROSS-REFERENCE TO RELATED APPLICATION

This Application relates to an application U.S. Ser. No. 09/334,743 being filed by Masashi Mori et al, based on Japanese Patent Application No. 10-172388 filed on Jun. 19, 1999, entitled "Image Display Device and Image Display Method" and assigned to the present assignee. The disclosure of that application is incorporated herein by reference.

BACKGROUND OF THE INVENTION

The present invention relates to an image display device which is arranged to display an image composed of video signals in synchronization with the timing of a dot clock generated by a horizontal synchronizing (sync) signal for driving the imaging device.

As disclosed in JP-A-7-160222, there has been conventionally known a liquid crystal display device which is arranged to display an image in response to video signals for driving a CRT display device supplied from a personal computer, a workstation, a VTR or the like.

The liquid crystal display device (LCD) disclosed in the JP-A-7-160222 is arranged as shown in a block diagram of FIG. 13. That is, a video signal R101 (Red), a video signal G102 (Green), and a video signal B103 (Blue) for driving a CRT display device are converted into the digital image data 106, 107, and 108 through the effect of A/D converting circuits 10, 11 and 12 each serving as an analog-to-digital (A/D) converting means and then the resulting digital image data are outputted into a display control circuit 13. The display control circuit 13 is input with the digital image data 106, 107 and 108, the dot clock 109, a horizontal sync signal 104, and a vertical sync signal 105. The circuit serves to convert those signals into those of the formats adapted for the liquid crystal display unit 14 and then display the image on the LCD unit 14.

On the other hand, a variable delay generating circuit 9 operates to properly delay the horizontal sync signal 104 and then output the delayed signal as a delayed horizontal sync signal 110 into a PLL circuit (Phased Loop Lock) 15 serving as means for generating the dot clock.

The PLL circuit 15 operates to generate the corresponding dot clock 109 to the pixels in synchronization with the delayed horizontal synchronous signal 110 and then output the dot clock 109 as the conversion timing signal for the A/D converting circuits 10, 11 and 12. If the delay of the variable delay generating circuit 9 is changed, the phase of the clock 109 generated in synchronization with the signal 110 is changed accordingly. The delayed horizontal sync signal 110 outputted from this variable delay generating circuit 9 is subject to the following adjustment. The phase of the dot clock 109 is changed so that the sampling timings of the A/D converting circuits 10, 11 and 12 are located on the centers of the analog video signals 101, 102 and 103. The adjustment of the variable delay generating circuit 9 will be described below with reference to FIGS. 14A–14G.

FIGS. 14A and 14C show signals output from a personal computer or a workstation. Specifically, the signal shown in FIG. 14A denotes a horizontal sync signal 104 and the signal shown in FIG. 14C denotes an analog video signal R101. This holds true to the other analog video signals G101 and B103. Hence, the concrete signals about the other analog video signals are left out. FIG. 14B shows the dot clock outputted from the PLL circuit 15. FIGS. 14D to 14G show the dot clock 109 and the video signal R101 expanded toward the time axis. In FIG. 14E, a waveform B shown in a real line denotes an analog video signal R101 outputted from a personal computer or a workstation. If the secured frequency band of this analog video signal R101 is high enough, the analog video signal R101 is made to take a waveform A shown by a broken line. Actually, the analog video signal is made to take the waveform B shown by a real line because the high frequency characteristics of the video output circuit and a transmission cable are degraded.

Herein, FIG. 14D shows the dot clock generated if the variable delay generating circuit 9 is not properly adjusted. In this case, as shown in FIG. 14E, focusing on an S1 point, a sampled portion is not the peak of the obtuse waveform B. Hence, the S1 point takes a different value from the value to be given if the waveform A is sampled, so that an error shown by Ve takes place. This error causes the contrast on the display to be degraded.

On the other hand, FIG. 14F shows the dot clock to be given if the variable delay generating circuit 9 is properly adjusted. In this dot clock, as shown in FIG. 14G, the peak of the obtuse waveform B is sampled. Hence, this sampling gives rise to the same digital data value as the value to be given if the waveform A is sampled. This makes it possible to avoid degrading of the display quality such as degraded contrast.

The disadvantages of the conventional image display device arranged as shown in FIG. 13 will be described below with reference to FIGS. 15A–15D. FIG. 15A shows the dot clock 109 described with reference to FIG. 13. FIGS. 15B to 15D show the analog video signals R101, G102 and B103 outputted from a personal computer or a workstation. The dot clock 109 shown in FIG. 15A takes a phase given if the adjustment of the variable delay generating circuit 9 is properly done with respect to the analog video signal R101 shown in FIG. 15B. In this case, as described with reference to FIGS. 14A–14G, an SR point, that is, a peak of the analog video signal waveform is sampled. This sampling gives rise to the same digital data value as the value to be given if an ideal square waveform is sampled. This results in avoiding the degrading of the display quality such as degraded contrast.

Actually, however, the analog video signal outputted from a personal computer or a workstation disadvantageously includes skew among the Red, the Green and the Blue video signals because of a variety of characteristics of the image output circuits and the transmission cables located inside of the personal computer or the workstation. In FIGS. 15A–15D, for the purpose of making the description easier, the Red, the Green and the Blue signals have the same waveforms except their skews. If this analog video signal G102 and the video signal B103 are sampled through the use of the dot clock 109 shown in FIG. 15A, the analog video signals G102 and B103 are sampled at the SG and the SB points. It means that the sampled results have the errors VeG and VeB as compared with the values to be given by sampling the ideal square waveforms.

These errors make the relation among the Red, the Green and the Blue out of balance, thereby causing color blur. Therefore, if the analog video signals have skews among the Red, the Green and the Blue, whatever kind of adjustment the variable delay generating circuit 9 may be performed, the same digital data values as those to be given by sampling the ideal square waveforms cannot be obtained with respect to all of the colors, the Red, the Green and the Blue. This kind of disadvantage is remarkable in high-resolution image display devices in which the dot clock 109 has a high frequency.

SUMMARY OF THE INVENTION

It is an object of the present invention to provide an image display device arranged to convert an analog video signal into a digital video signal which device may suppress color blur if the analog video signal has skews among the color video signals.

To achieve the foregoing object, the image display device according to an aspect of the present invention includes variable delay means for delaying an analog video signal of each color or clock variable delay means for delaying a dot clock for generating the dot clock of each color and supplying these dot clocks as conversion timing signals of the color analog-to-digital converting means of the corresponding color, for adjusting the phase of the analog video signal or the dot clock in each color.

BRIEF DESCRIPTION OF THE DRAWINGS

FIG. 4 is a block diagram showing a detailed arrangement of a variable delay circuit;

FIGS. 5A to 5D are waveform charts for describing the operation of an adjusting switch circuit;

DETAILED DESCRIPTION OF EMBODIMENTS

First Embodiment

Figure 1:
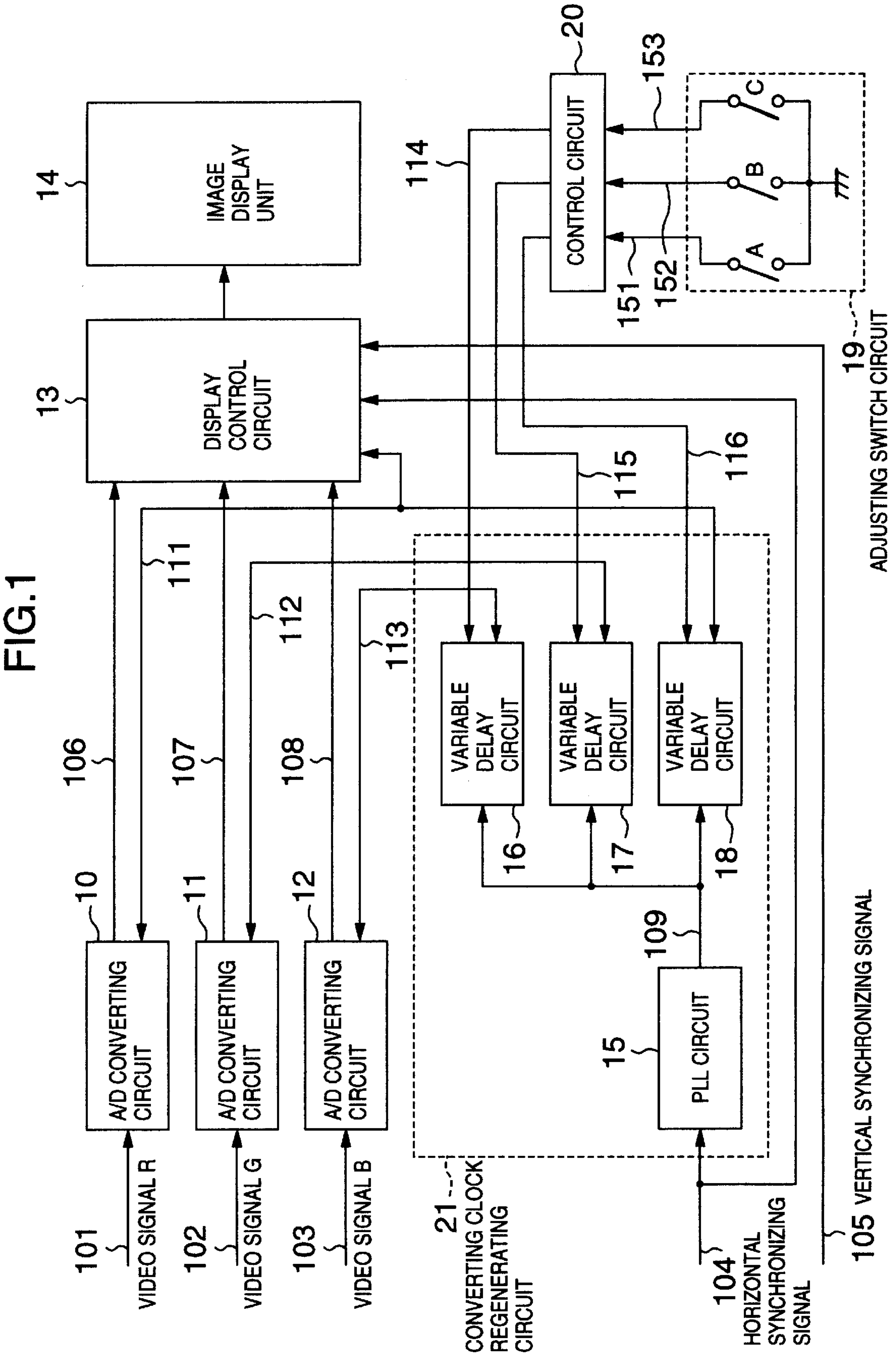
FIG. 1 is a block diagram showing an image display device according to a first embodiment of the present invention.

FIG. 1 is a block diagram showing an image display device according to the first embodiment of the present invention. This image display device is arranged to have A/D converting circuits 10 to 12 for each color, a converting clock regenerating circuit 21, a display control circuit 13, an image display unit 14, an adjusting switch circuit 19, and a control circuit 20. The converting clock regenerating circuit 21 is composed of a PLL circuit 15 and variable delay circuits 16 to 18.

In this arrangement, the signal for driving a CRT display device is mainly composed of analog video signals R101 (Red), G102 (Green), and B103 (Blue), a horizontal sync signal 104, and a vertical sync signal 105. The analog video signals R101, G102 and B103 are converted into digital image data 106, 107 and 108 through the effect of the A/D converting circuits 10, 11 and 12 and then are outputted to the display control circuit 13.

The display control circuit 13 is inputted with the digital image data 106, 107 and 108, a converting clock R111, a horizontal sync signal 104, and a vertical sync signal 105. Then, the display control circuit 13 operates to convert those signals into those of the format adapted to the liquid crystal display unit 14 and then enables the image display unit 14 to display the image.

The image display unit arranged to display the digital signal as described about this embodiment may be a liquid crystal display (LCD), a plasma display, or the like.

The PLL circuit 15 is inputted with the horizontal sync signal 104 and serves to frequency-multiply the horizontal sync signal 104 for generating the dot clock 109 synchronized with the edges of the horizontal sync signal 104. The dot clock 109 is delayed by the variable delay circuits 16 to 18 and then outputted as the converting clocks R111, G112 and B113. These converting clocks R111, G112 and B113 are used as the conversion timings of the A/D converting circuits 10, 11 and 12. The A/D converting circuits 10, 11 and 12 operate to convert the analog video signals R101, G102 and B103 into the digital image data 106, 107 and 108 in synchronization with these converting clocks R111, G112 and B113 and then output the resulting digital image data.

The delaying amounts of the variable delay circuits 16 to 18 are adjusted by the user's operation of the adjusting switch circuit 19. Based on the operated result, the control circuit 20 operates to change the adjusting signals 114 to 116 for the colors and adjust the delaying amounts of the variable delay circuits 16 to 18 in respective colors.

Figures 2A, 2B, 2C, 2D, 2E, 2F, 2G:
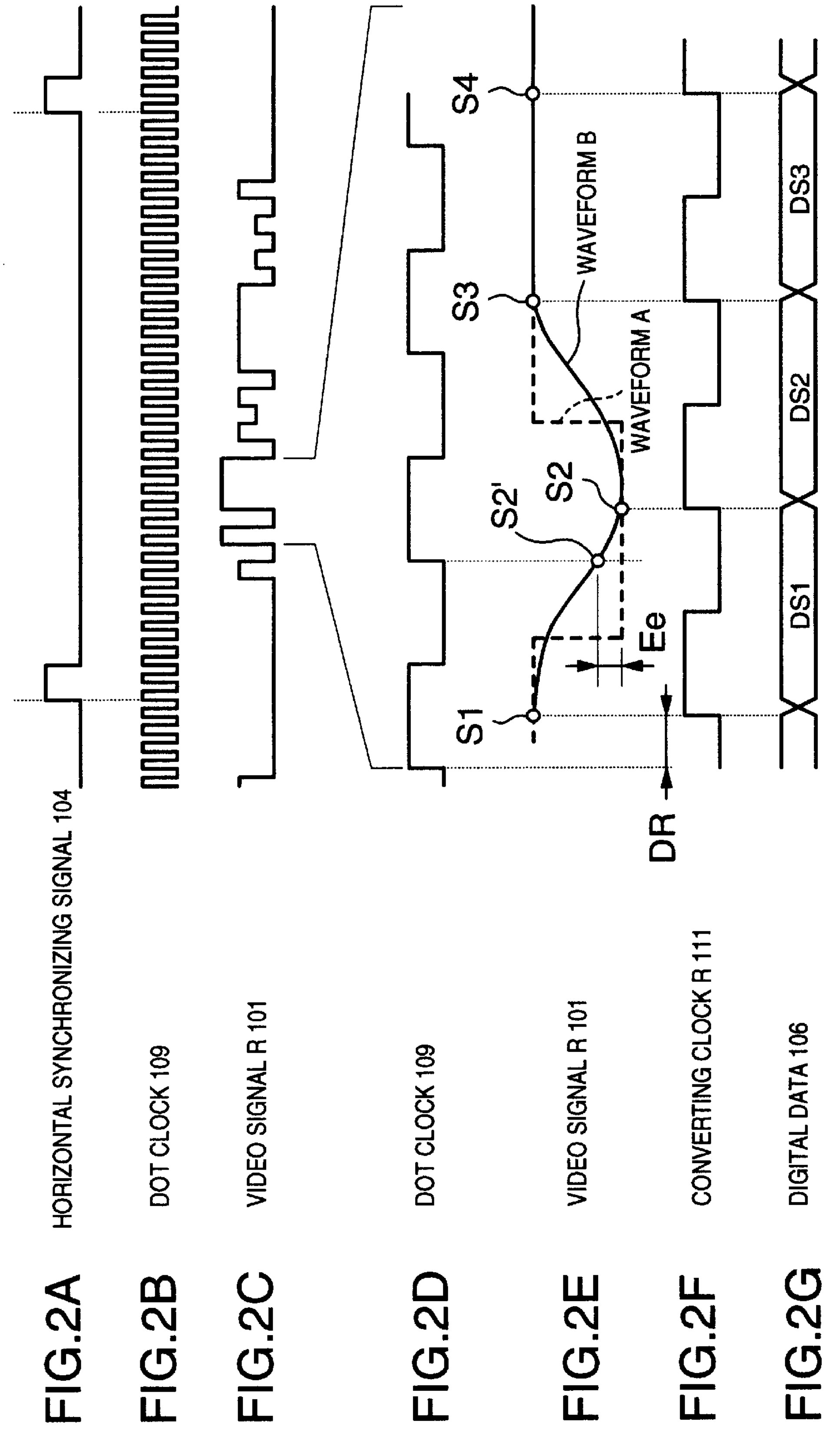
FIGS. 2A to 2G are waveform charts for describing the operation of the embodiment shown in FIG. 1.

Hereafter, the detailed operation of the image display device shown in FIG. 1 will be described with reference to the waveform charts shown in FIGS. 2A to 2G. In FIGS. 2A–2G, for making the description easier, only the Red signal of the three primary color signals will be described. FIGS. 2A and 2C show the signals outputted from a personal computer or a workstation, in which FIG. 2A shows a horizontal sync signal 104 and FIG. 2C shows an analog video signal R101. FIG. 2B shows a dot clock 109 generated by the PLL circuit 15 based on the horizontal sync signal 104.

In order to analog-to-digital convert the analog video signal R101 into the digital video signal at each dot (at each pixel), the dot clock 109 is set to have the same frequency as the dot clock inside of the personal computer or the workstation that is a transmitting source for the analog video signal R101.

The signals shown in FIGS. 2D to 2G are partially expanded toward the time axis. FIG. 2D shows the dot clock 109. FIG. 2E shows the analog video signal R101. As described above, the analog video signal outputted from the personal computer or the workstation is made to take a square waveform A indicated by a broken line if the secured frequency band of the analog video signal is high enough. In actual, the analog video signal is made to take the obtuse waveform B shown by a real line because the frequency characteristics of the image output circuit and the transmission cable are degraded. At this time, focusing the sampling point S2' of the dot clock 109, the other point (S2') rather than the peak value of the obtuse waveform B is sampled. This sampling gives rise to the different value from the value to be given if the waveform A is sampled, thereby bringing about an error Ee in the analog-to-digital conversion.

On the other hand, if the sampling point may be moved to S2, the peak value of the obtuse waveform B is sampled. This sampling gives rise to the same digital data value as the value to be given by sampling the waveform A. That is, the delay amount DR of the variable delay circuit 18 is adjusted so that the sampling point is moved from S1 to S4. This adjustment makes it possible to obtain the converting clock R111 of the phase shown in FIG. 2F, thereby generating the same digital data value as the value to be given by sampling the waveform A. FIG. 2G shows the resulting digital data 106, in which the data value given if the S1 point is sampled is DS1, the data value given if the S2 point is sampled is DS2, and the data value given if the S3 point is sampled is DS3.

The digital image data 106 to 108 of the primary colors are outputted to the image display unit 14 through the display control circuit 13. The image display unit 14 is operated to display the corresponding image to the digital image data 106 to 108.

In turn, the description will be oriented to the operation appearing if the analog video signals R101 to B103 outputted from a personal computer or a workstation have skews among the Red, the Green and the Blue signals because of a variety of characteristics of the image output circuit and the transmission cable located inside of the personal computer or the workstation.

Figures 3A, 3B, 3C, 3D, 3E, 3F, 3G:
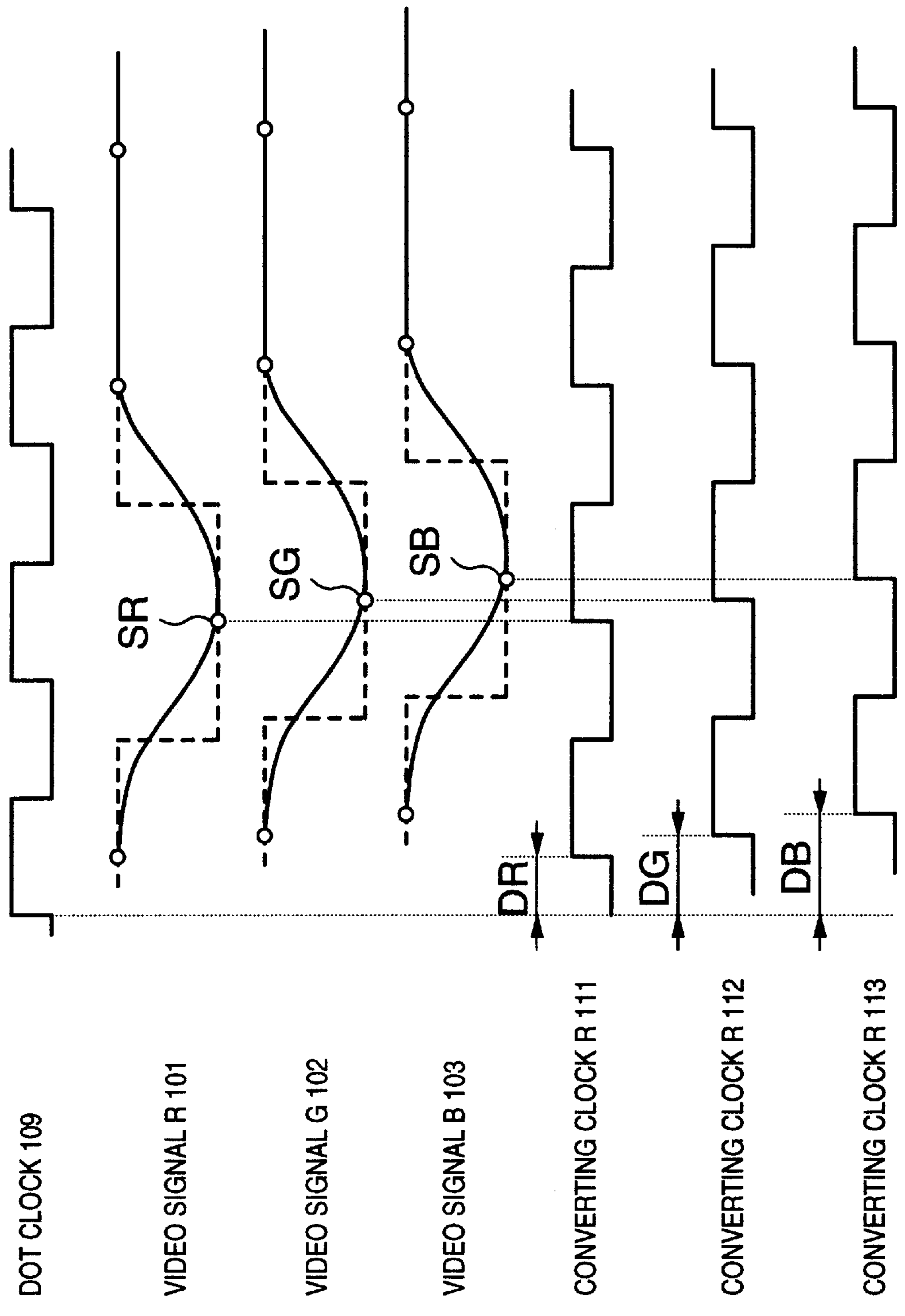
FIGS. 3A to 3G are waveform charts for describing the operation of the embodiment shown in FIG. 1.

FIG. 3A shows a dot clock 109. FIG. 3B shows an analog video signal R101. FIG. 3C shows an analog video signal G102. FIG. 3D shows an analog video signal B103. As described with reference to FIGS. 2–2G, the sampling points are required to be fitted to SR, SG and SB so that when sampling the actual obtuse waveform, it is possible to obtain the same digital data value as the value to be given by sampling an ideal square waveform. Conventionally, since the dot clock 109 is common to the Red, the Green and the Blue, the sampling point cannot be adjusted in each of the Red, the Green and the Blue signals. On the other hand, the image display device of this embodiment is arranged to provide the variable delay circuits for the Red, the Green and the Blue colors, so those circuits may be adjusted so that the sampling points are moved to SR, SG and SB. As shown in FIGS. 3E to 3G, the adjustment is executed by operating the adjusting switch circuit 19 and controlling the adjusting signals 114 to 116 for the colors so that the variable delay circuits 16 to 18 may have the DR, DG and DB delay amounts.

FIG. 4 shows an arrangement of the variable delay circuit 18 as a representative one of the variable delay circuits 16 to 18. The variable delay circuit 18 is composed of logic buffers 70 to 76 and a selector circuit 77. The logic buffers 70 to 76 are used as delay elements for the dot clock 19. The selector circuit 77 is used for selecting when a signal is to be outputted, that is, when a signal is passed out of the logic buffer 70, when a signal is passed out of the logic buffer 71, . . . , when a signal is passed out of the logic buffer 76. The selector circuit 77 is switched by an adjusting signal 116. Concretely, if the adjusting signal 116 has a value of "0", the dot clock 109 having passed no logic buffer is selected. If the adjusting signal 116 has a value of "1", the output of the logic buffer 70 is selected. If the adjusting signal 116 has a value of "2", the output of the logic buffer 71 is selected. This is the way the control is executed. This makes the delaying amount maximum if the adjusting signal 116 has a value of "7" and minimum if the adjusting signal 116 has a value of "0". That is, the variable delay circuit is arranged to have eight stages.

FIG. 4 shows the eight-stage variable delay circuit. In actual, the increase or decrease of the stages of the logic buffers makes it possible to implement various stages of the logic buffers in the variable delay circuit.

On the other hand, the adjusting switch circuit 19 may take various arrangements. As an example, as shown in FIG. 1, just three switches A to C may be provided. The three switches A to C may be mounted on such a site of the image display device that the user can operate those switches. For example, the switch A is allocated to the sampling timing adjustment of the Red, that is, the delaying amount adjustment of the variable delay circuit 18. The switch B is allocated to the sampling timing adjustment for the Green, that is, the delaying amount adjustment of the variable delay circuit 17. The switch C is allocated to the sampling timing adjustment for the Blue, that is, the delaying amount adjustment of the variable delay circuit 16.

The switches A to C are controlled in the same manner. Hence, the description will be oriented to only the operation of the sampling timing adjustment for the Red with the switch A with reference to FIGS. 5–5D. FIG. 5A is a timing chart showing the operated result of the switch A included in the adjusting switch circuit 19. When the switch A is pressed, the on state takes place, which is denoted by "H level". When the switch A is not pressed, it is in an off state, which is denoted by "L level". FIG. 5B shows an output signal 151 of the switch A. When the switch A is activated (depressed), the on state takes place, when the "L level" appears. When the switch A is not activated, the off state remains, when the "H level" exists.

The control circuit 20 composed of a microcomputer is inputted with output signals 151 to 153 of the adjusting switch circuit 19. The control circuit 20 operates to change the adjusting signals 114 to 116 based on the output signals 151 to 153 and set the delaying amounts of the variable delay circuits 16 to 18. When the control circuit 20 recognizes the falling edge of the output signal 151 of the switch A, the control circuit 20 operates to increment the adjusting signal 116 by "1" as shown in FIG. 5C. However, when the control circuit 20 recognizes the falling edge of the output signal 151 of the switch A in the state that the adjusting signal 116 has a maximum value of "7", the control circuit 20 operates to change the adjusting signal 116 into "0" as shown by FIGS. 5C and 5D.

As set forth above, when the user of the image display device presses the switch A, the delaying amount of the variable delay circuit 18 may be controlled to be increased by one step, so that the sampling timing of the Red analog video signal R101 may be adjusted. Since the other switches B and C have the same arrangement as the switch A, by operating the switch B, the sampling timing of the Green analog video signal G102 may be adjusted and by operating the switch C, the sampling timing of the Blue analog video signal B103 may be adjusted. When the user of the image display device manually operates the switches A to C of the adjusting switch circuit 19 as viewing the display image, the user can find out the point where the least color blur takes place, for the purpose of adjusting the most approximate image quality.

As set forth above, according to this embodiment, if the analog video signal outputted from a personal computer or a workstation may have skews among the Red, the Green and the Blue because of a variety of characteristics of the image output circuit and the transmission cable, the phase of the dot clock 109 may be adjusted in each of the Red, the Green and the Blue. Hence, the resulting display image contains the least color blur.

Figure 6:
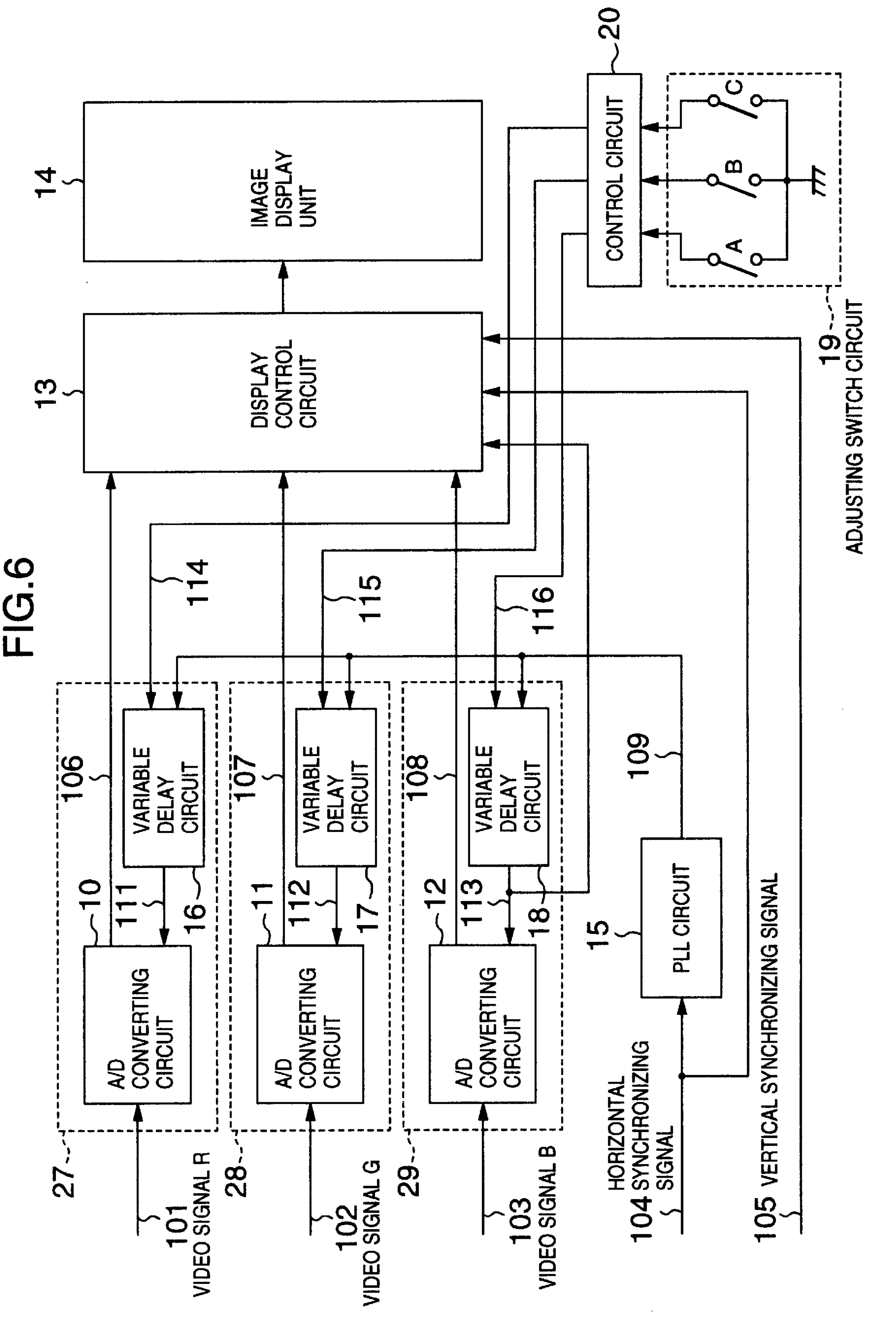
FIG. 6 is a block diagram shows a transformation of the arrangement shown in FIG. 1 in which an A/D converting circuit and a variable delay circuit are incorporated in one LSI.

In this embodiment, as shown in FIG. 6, with analog-to-digital converting LSI means 27 to 29 each of which integrates the A/D converting circuit with the variable delay circuit, the circuit arrangement is made simpler. Further, since the converting clock R111, the converting clock G112 and the converting clock B113, that are fast clock signals, are wired inside of the LSI, the power consumption of the logic buffers (70 to 76 in FIG. 4) of the variable delay circuits 16 to 18 is made advantageously lower. Except the integration of the A/D converting circuit and the variable delay circuit, FIG. 6 shows the same arrangement as that shown in FIG. 1. Hence, the description thereabout is left out.

Figure 7:
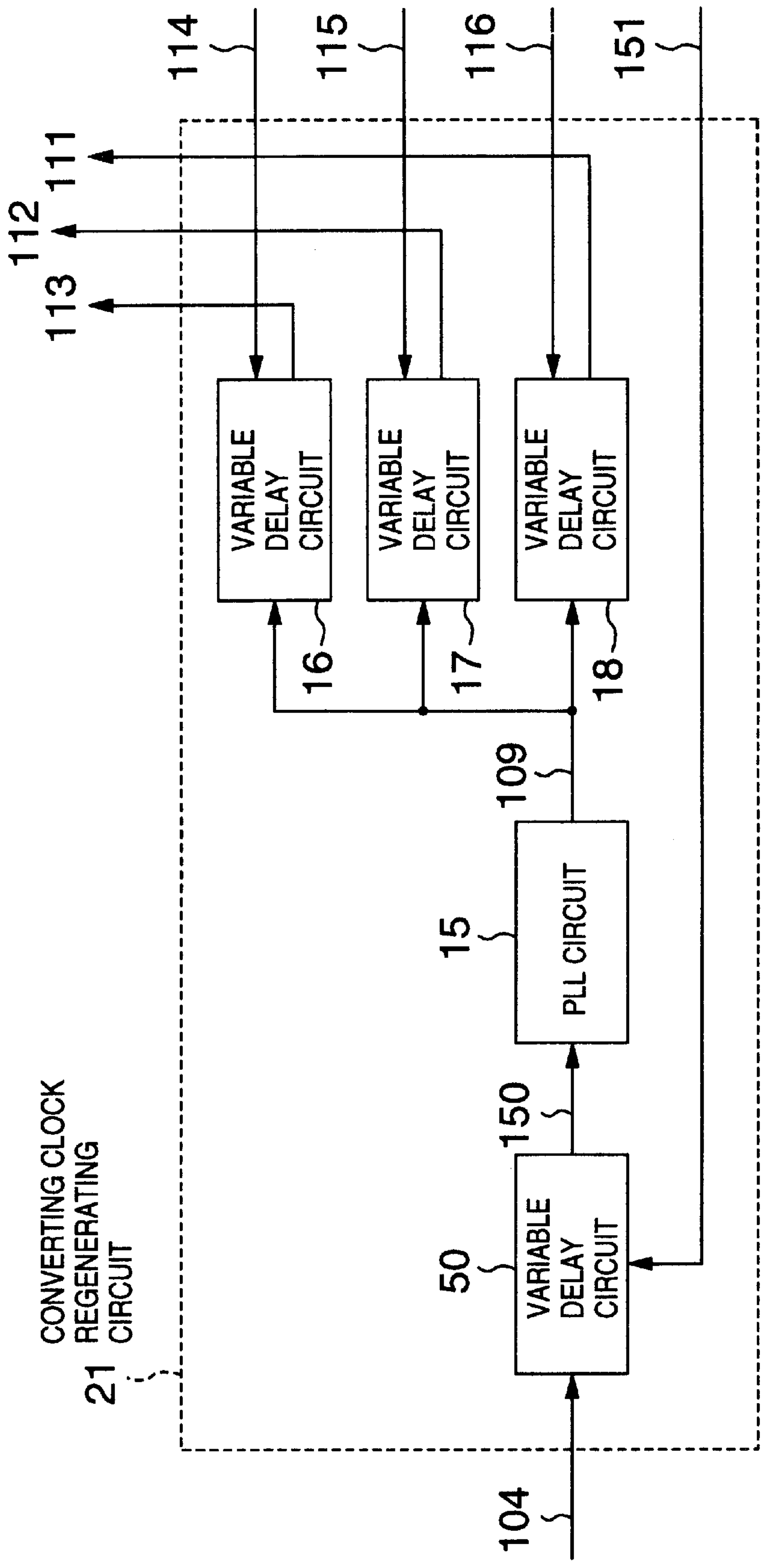
FIG. 7 is a block diagram showing another arrangement of a converting clock regenerating circuit shown in FIG. 1.

The other arrangement of the converting clock regenerating circuit 21 shown in FIG. 1 is shown in FIG. 7. The converting clock regenerating circuit 21 shown in FIG. 7 is composed of the PLL circuit 15, the variable delay circuits 16 to 18, and the variable delay circuit 50. Later, the description will be oriented to the operation of the image display device in the case of using the converting clock regenerating circuit 21 shown in FIG. 7. In addition, FIGS. 8A–8I shows the operation of the converting regenerating circuit if the analog video signals R101 to B103 outputted from the personal computer or the workstation have skews among the Red, the Green and the Blue because of a variety of characteristics of the image output circuit and transmission cable.

Figures 8A, 8B, 8C, 8D, 8E, 8F, 8G, 8H, 8I:
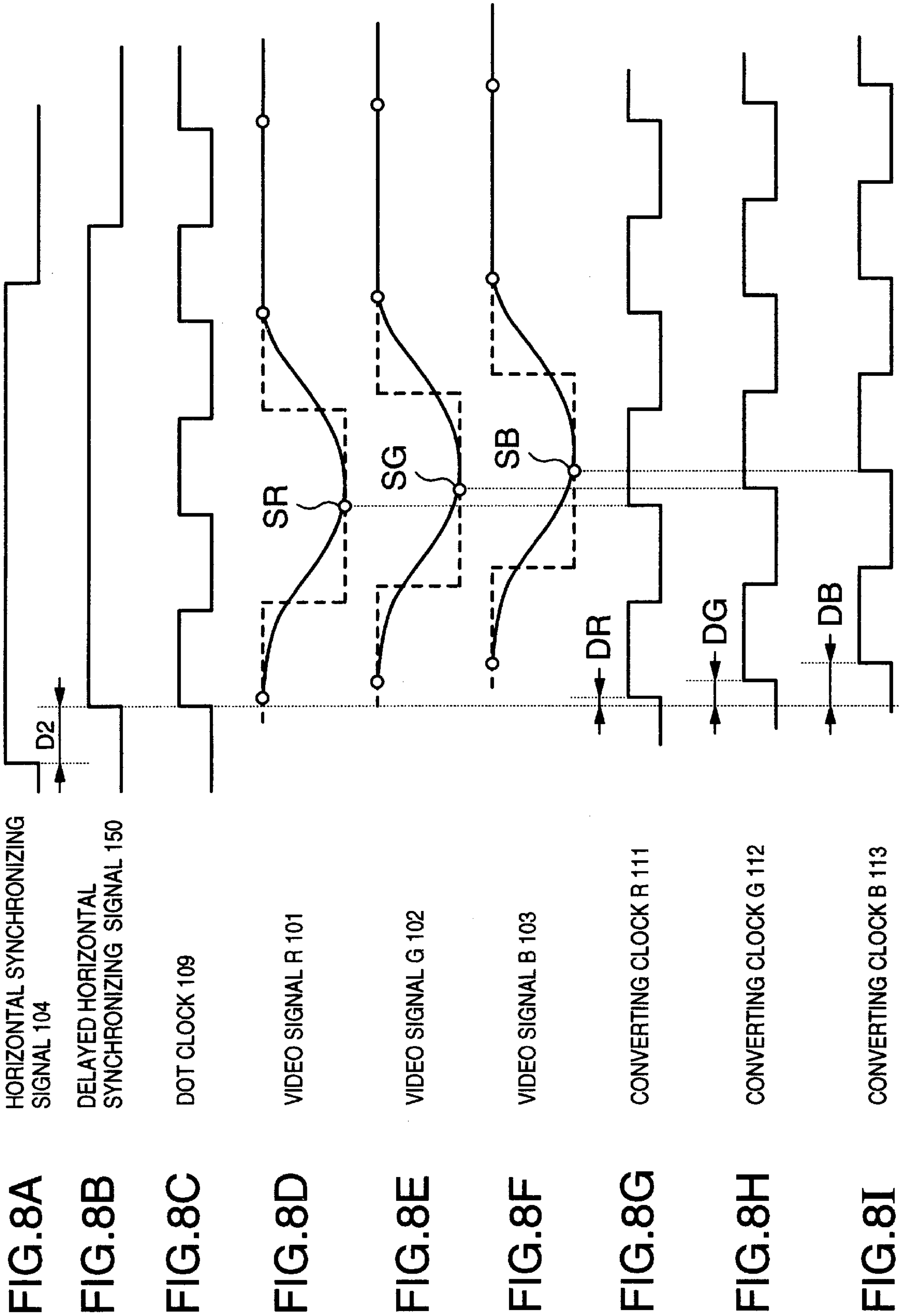
FIGS. 8A to 8I are waveform charts for describing the operation of the converting clock regenerating circuit shown in FIG. 7.

FIG. 8A shows a horizontal sync signal 104. FIG. 8B shows a delay horizontal sync signal 150 derived by delaying the horizontal sync signal 104 by the variable delay circuit 50. FIG. 8C shows a dot clock 109 generated by the PLL circuit 15 based on the delay horizontal sync signal 150. The edges of the dot clock 109 are synchronized with the edgee of the delay horizontal sync signal 150. Hence, by adjusting the delaying amount of the variable delay circuit 50 and changing the phase of the delay horizontal sync signal 150, the phase of the dot clock 109 may be changed. FIG. 8D shows an analog video signal R101. FIG. 8E shows an analog video signal G102. FIG. 8F shows an analog video signal B103.

As has been set forth above with reference to FIGS. 2–2G, in order to obtain the same digital data value as the value to be given in sampling an ideal square waveform even when sampling the actual obtuse waveform, it is necessary to adjust the image display device so that the sampling points are made to be SR, SG and SB. In this embodiment, hence, the adjustment is done at two stages. At first, as shown in FIG. 8B, a coarse adjustment is done for changing a delaying amount of the variable delay circuit 50. That is, the adjusting switch circuit 19 is operated to control the adjusting signal 151 so that the variable delay circuit 50 may be subject to the delaying amount D2 shown in FIG. 8B. In particular, if the analog video signals R101 to B103 have no skew among the Red, the Green and the Blue, this coarse adjustment may completely suppress the color blur. However, if the analog video signals R101 to B103 have skews among the Red, the Green and the Blue, this coarse adjustment cannot completely suppress the color blur.

Then, as shown in FIGS. 8G to 8I, the adjusting switch circuit 19 is operated to control the adjusting signals 114 to 116 so that the variable delay circuits 16 to 18 may have the delaying amounts DR, DG and DB, respectively. This two-stage adjustment makes it possible for the sampling points to fit to the SR, SG and SB, respectively.

The image display device having the converting clock regenerating circuit 21 shown in FIG. 7 offers the same effect as the device of the embodiment shown in FIG. 1. Further, the variable delaying circuit 50 roughly adjusts the delaying amount and the variable delay circuits 16 to 18 just adjust the skew components among the Red, the Green and the Blue. Hence, the image display device having the converting clock regenerating circuit 21 is advantageous in making the variable ranges of the delaying amounts of the variable delay circuits 16 to 18 smaller than the device of the embodiment shown in FIG. 1.

Second Embodiment

Figure 9:
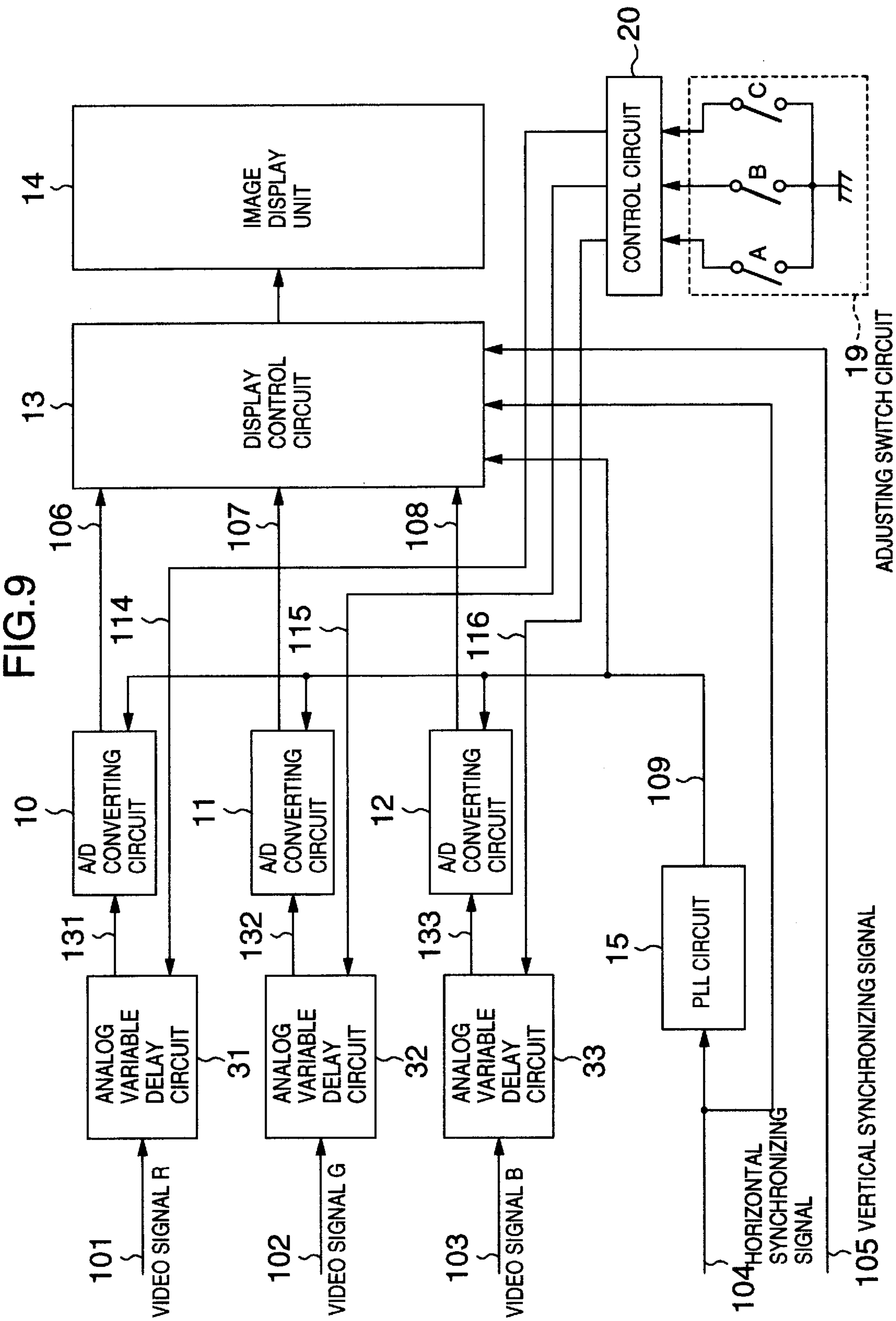
FIG. 9 is a block diagram showing an image display device according to a second embodiment of the present invention.

FIG. 9 is a block diagram showing an image display device according to a second embodiment of the present invention. In this embodiment, the image display device is arranged to have analog variable delay circuits 31 to 33, the A/D converting circuits 10 to 12, the PLL circuit 15, the display control circuit 13.

In this arrangement, the analog video signals R101, G102 and B103 are delayed by the analog variable delay circuits 31 to 33, respectively. Then, the delayed analog video signals are converted into digital image data 106, 107, 108 through the effect of the A/D converting circuits 10, 11, 12 served as analog-to-digital converting means and then outputted to the display control circuit 13. The display control circuit 13 is inputted with the digital image data 106, 107, 108, the dot clock 109, the horizontal sync signal 104, and the vertical synchronous signal 105 and then serves to convert those signals into the signals of the formats adapted for the liquid crystal display unit 14. The converted signals are sent to the image display unit 14 in which the corresponding image is displayed. The image display unit to be enabled by the digital video signals may be a liquid crystal display or a plasma display.

On the other hand, the PLL circuit 15 is inputted with the horizontal sync signal 104 and frequency-multiply the horizontal synchronous signal 104 for generating the dot clock 109 synchronized with the edges of the horizontal sync signal 104.

The dot clock 109 is outputted as clocks for regulating the conversion timings of the A/D converting circuits 10 to 12. The A/D converting circuits 10, 11, 12 operate to convert the analog video signals R101, G102 and B103 into the digital image data 106, 107 and 108 in synchronization with the dot clock 109 and then output the converted signals.

The delaying amounts of the analog variable delay circuits 31 to 33 are adjusted by operating the adjusting switch circuit 19 by the user of the image display device. Based on the operated result, the control circuit 20 operates to change the adjusting signals 114 to 116 in respective colors for adjusting the delaying amounts of the analog variable delay circuits 31 to 33.

Figure 10:
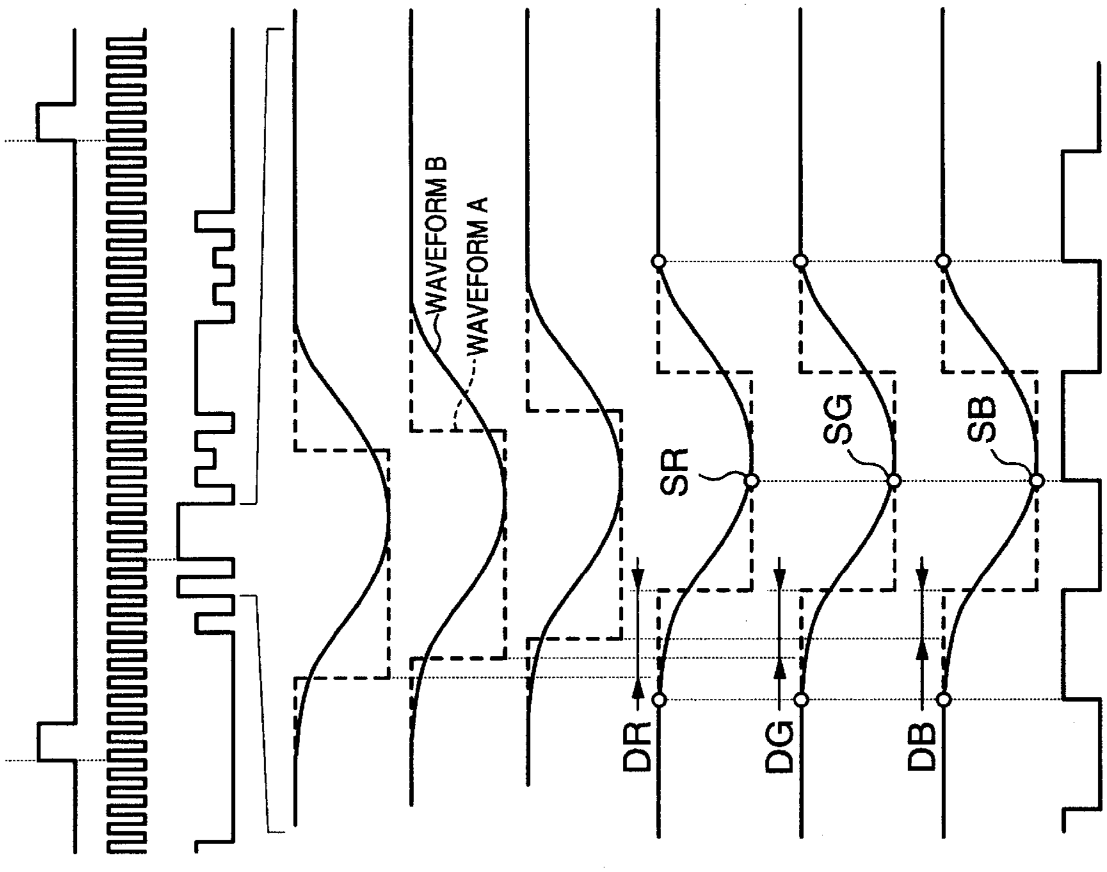
FIGS. 10A to 10J are waveform charts for describing the operation of the embodiment shown in FIG. 9.

Hereafter, the detailed operation of the embodiment shown in FIG. 9 will be described with reference to FIGS. 10–10J. FIG. 10A shows a horizontal sync signal 104. FIG. 10C shows an analog video signal R101. FIG. 10B shows a dot clock 109 generated by the PLL circuit 15 based on the horizontal sync signal 104. The dot clock 109 is set to have the same frequency as the dot clock inside of a personal computer or a workstation that is a transmitting source of the analog video signals R101, G102 and B103, for the purpose of analog-to-digital converting the video signal R101 in a one-dot-by-one-dot manner.

FIGS. 10D to 10J show the signals partially expanded toward the time axis. Herein, the analog video signals R101 to B103 outputted from the personal computer or the workstation contain skew components among the Red, the Green and the Blue because of a variety of characteristics of the image output circuit and the transmission cable. FIGS. 10D to 10F show analog video signals R101, G102 and B103 outputted from the personal computer or the workstation.

FIGS. 10G to 10I show delayed video signals R131, G132 and B133 that are generated by delaying the analog video signals R101, G102 and B103 through the use of the analog variable delay circuits 31 to 33. FIG. 10J shows a dot clock 109.

In adjusting the analog variable delay circuits 31 to 33, it is necessary to make the sampling points SR, SG, and SB fitted to the peak values of the waveform so that those circuits 31 to 33 may obtain the same digital data value as those to be given by sampling the ideal square waveform A when sampling the actual obtuse waveform B. In this embodiment, in place of adjusting the phase of the dot clock, the analog video signals R101, G102 and B103 are delayed on their own timings.

FIGS. 10G to 10I show the delayed video signals R131, G132, and B133. Those delayed video signals are generated by delaying the analog video signals R101, G102, and B103 through the use of the analog variable delay circuits 31 to 33 so that the sampling points SR, SG, and SB are fitted to the peaks of the waveform, respectively.

The user of the image display device operates to control the adjusting signals 114 to 116 by operating the adjusting switch circuit 19 so that the analog variable delay circuits 31 to 33 may have the delaying amounts SR, SG, and SB, respectively. This control makes it possible to meet the sampling points SR, SG, and SB to the peaks of the waveform.

Each arrangement of the analog variable delay circuits 31 to 33 is basically identical with the variable delay circuit 18 described above with reference to FIG. 4, except that the logic buffers 70 to 76 shown in FIG. 4 are replaced with analog buffers and the logic selector circuit 77 is replaced with an analog selector circuit. In this arrangement, the analog buffers are used as delay elements for the video signals R to B and the selector circuit 77 is used to selectively output a signal having passed out of any analog buffer, that is, a signal having passed out of the first analog buffer . . . a signal having passed out of the n-th analog buffer.

The selector circuit 77 is switched by the adjusting signals 114 to 116. For example, the selection is controlled as follows: If the adjusting signal is “0”, the video signals R to B having passed no analog buffer are selected. If the adjusting signal is “1”, the output of the analog buffer 70 is selected. If the adjusting signal is “2”, the output of the analog buffer 71 is selected. This control makes it possible to compose the eight-stage variable delay circuit so that the if the adjusting signal is “7”, the delaying amount is maximum and if the adjusting signal is “0”, the delaying amount is minimum. In this case, the increase or the decrease of the analog buffer stages results in implementing the variable delay circuit with various buffer stages.

The adjusting switch circuit 19 has the same arrangement as the circuit 19 of the embodiment shown in FIG. 1. Hence, the description thereabout is left out. The switches A to C have the adjusting methods of the variable delay circuits 16 to 18 described with reference to FIGS. 5A–5D. Hence, the description about the operation of the switches is left out as well.

As set forth above, according to this embodiment, if the video signal outputted from the personal computer or the workstation contains skew components among the Red, the Green and the Blue because of a variety of characteristics of the image output circuit and the transmission cable, the image display device of this embodiment enables to compensate for the skews in the Red, the Green and the Blue. Hence, the resulting display image contains less color blur.

Figure 11:
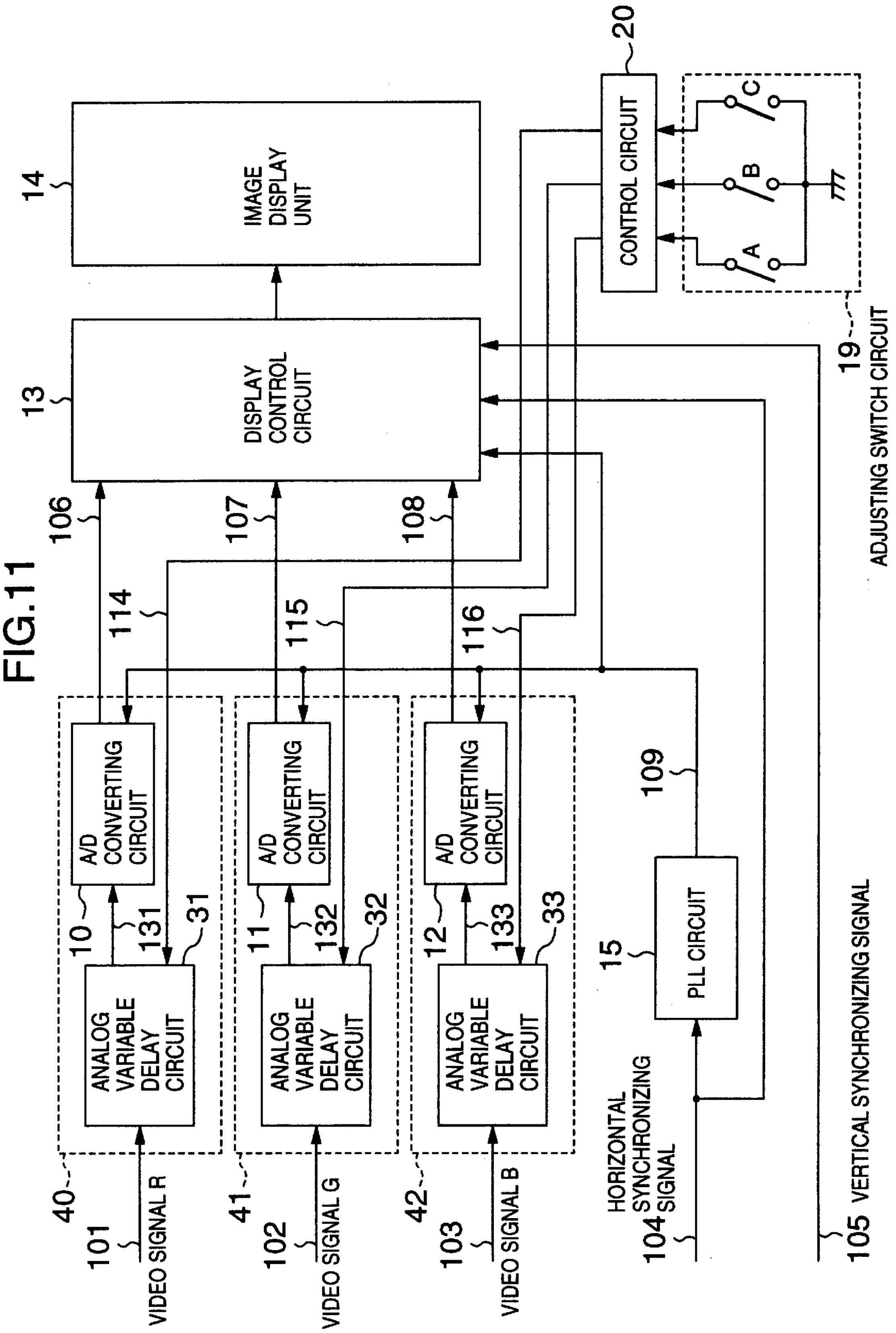
FIG. 11 is a block diagram showing an image display device according to a third embodiment of the present invention.

In this embodiment, with the analog-to-digital converting LSI means 40 to 42 having the A/D converting circuit and the analog variable delay circuit integrated with each other, the circuit arrangement is made simpler. Further, since the delayed video signals R131, G132 and B133 that are high-band analog signals are wired inside of the LSI, the analog buffers of the analog variable delay circuits 31 to 33 are made advantageously lower in power consumption. In addition, the arrangement shown in FIG. 11 is basically identical with the arrangement shown in FIG. 9 except that the A/D converting circuit and the analog variable delay circuit are integrated with each other. Hence, the description thereabout is left out.

Third Embodiment

Figure 12:
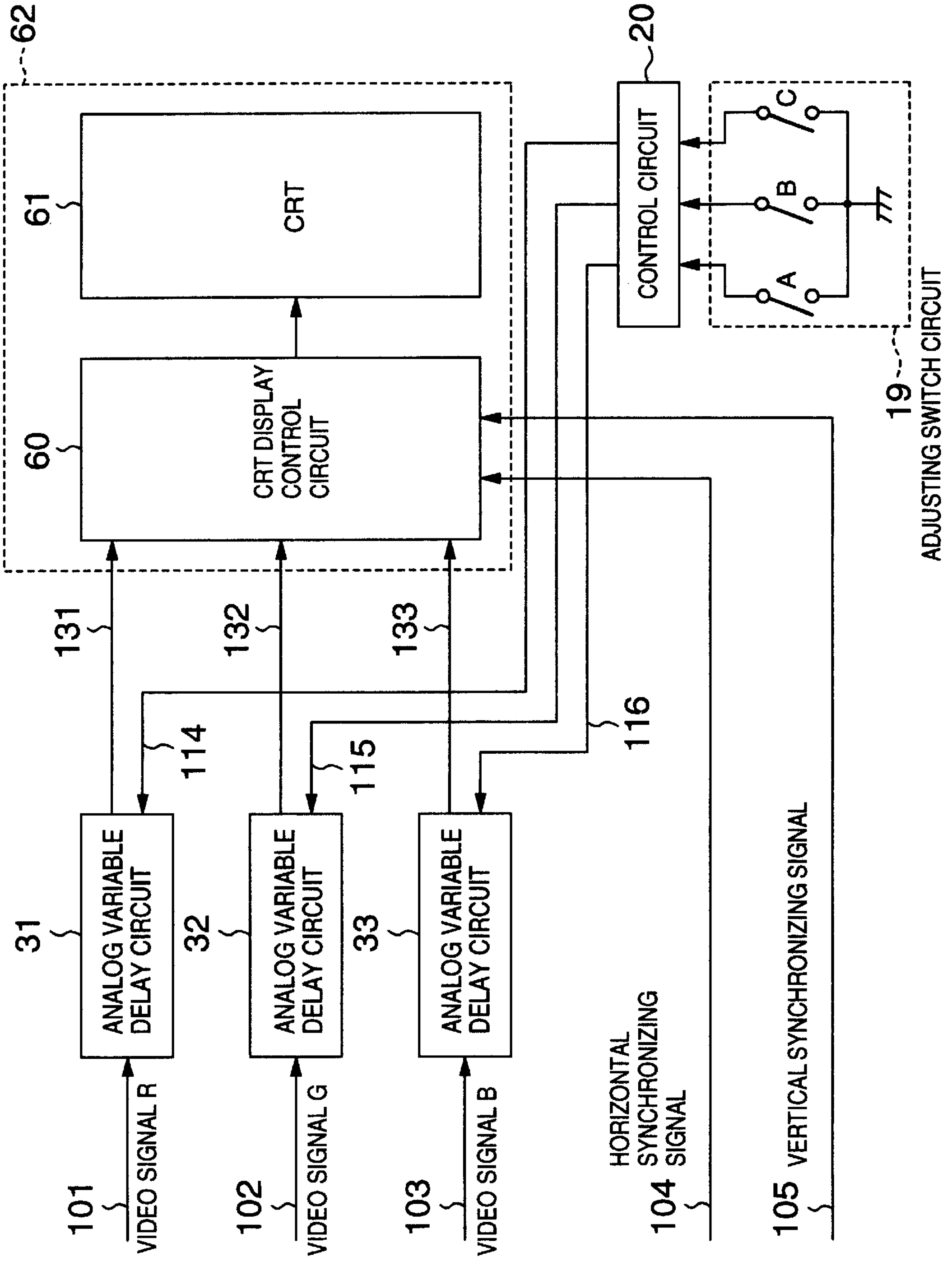
FIG. 12 is a block diagram showing an image display device according to a fourth embodiment of the present invention.
Figure 13:
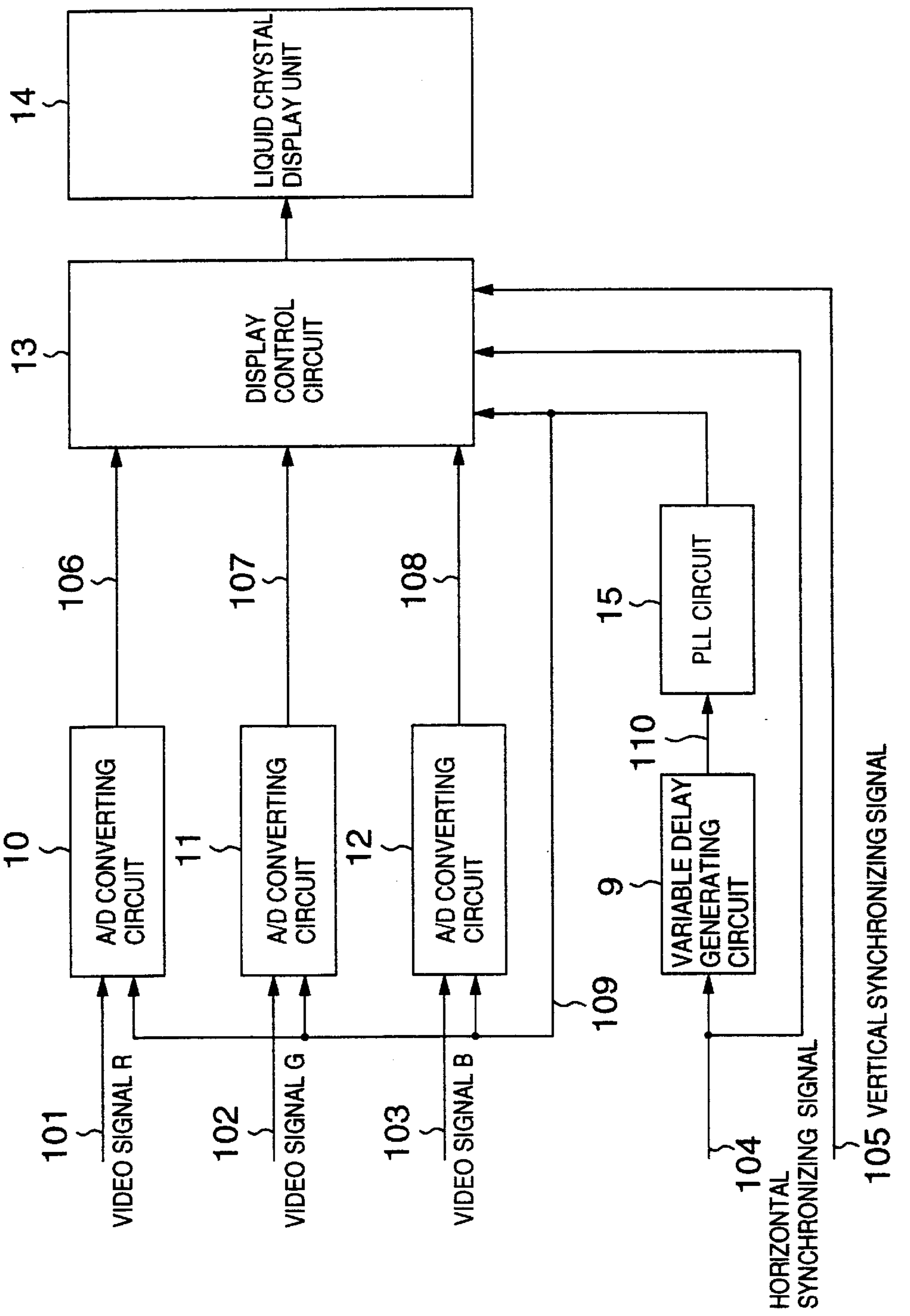
FIG.13 PRIOR ART
FIG. 13 is a block diagram showing the conventional image display device.
Figures 14A, 14B, 14C, 14D, 14E, 14F, 14G:
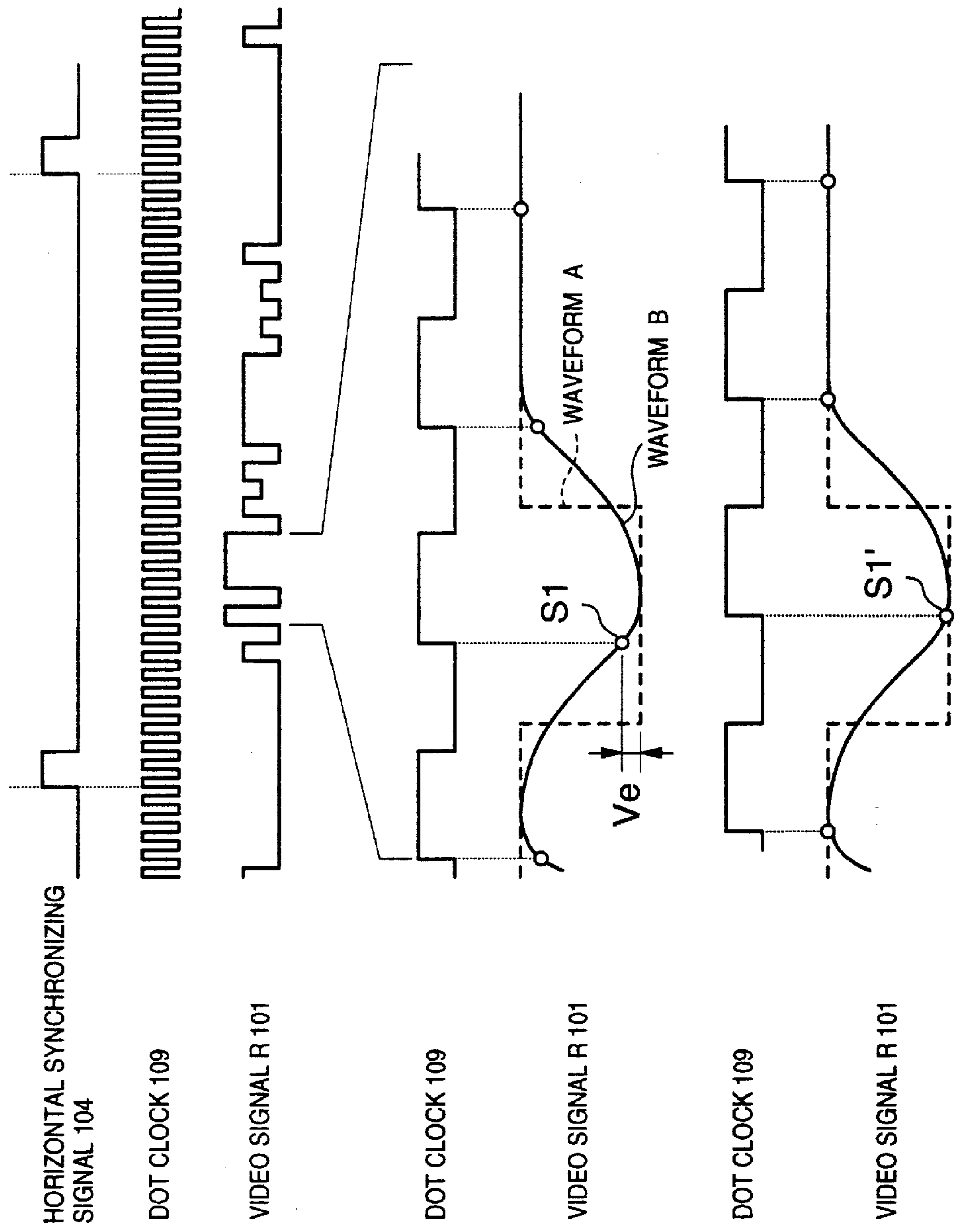
FIG.14A PRIOR ART
FIG.14B PRIOR ART
FIG.14C PRIOR ART
FIG.14D PRIOR ART
FIG.14E PRIOR ART
FIG.14F PRIOR ART
FIG.14G PRIOR ART
FIGS. 14A to 14G are waveform charts for describing the operation of the conventional image display device.
Figures 15A, 15B, 15C, 15D:
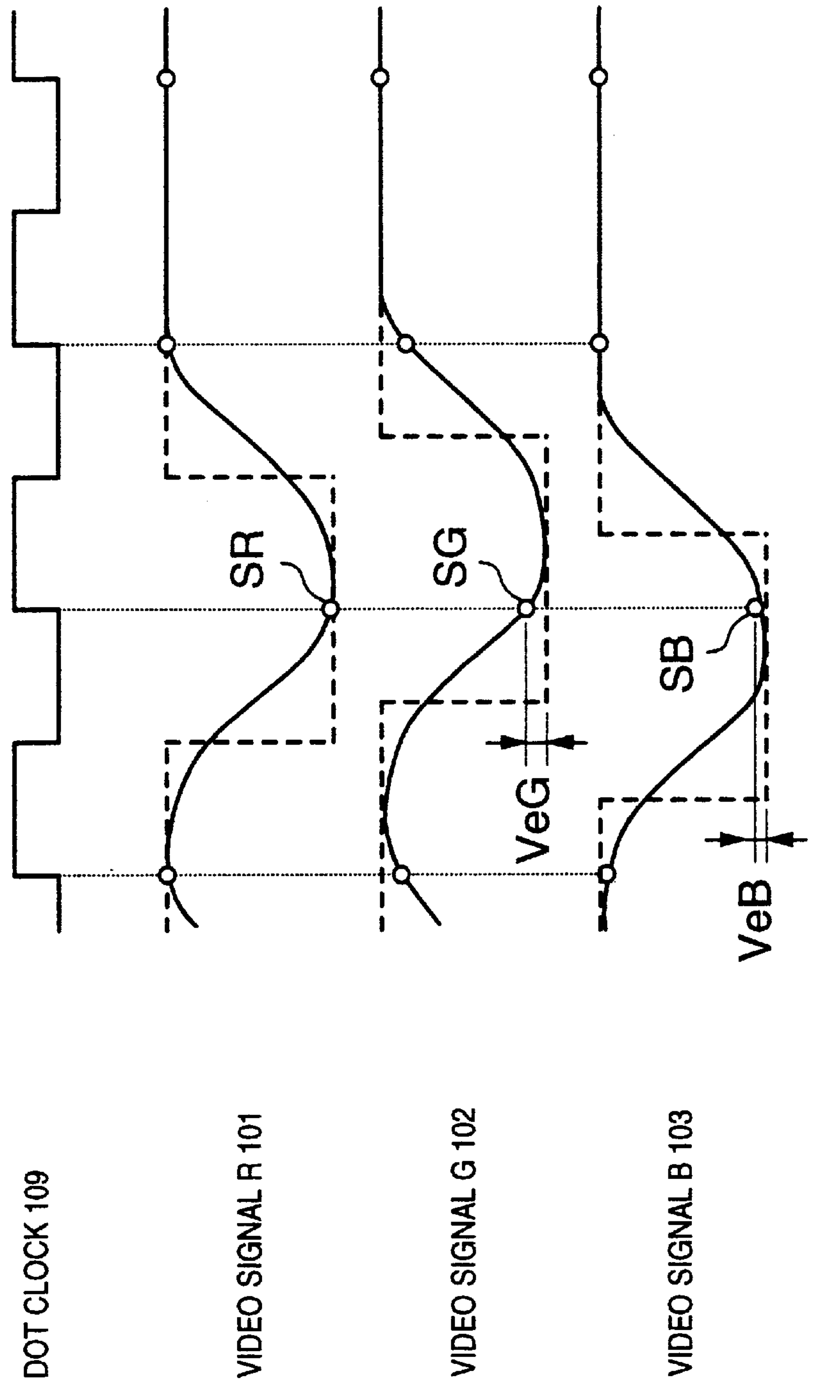
FIG.15A PRIOR ART
FIG.15B PRIOR ART
FIG.15C PRIOR ART
FIG.15D PRIOR ART
FIGS. 15A to 15D are waveform charts for describing the disadvantages of the conventional image display device.

FIG. 12 is a block diagram showing an image display device according to a third embodiment of the present invention. The image display device of this embodiment is arranged to have analog variable delay circuits 31 to 33, an adjusting switch circuit 19, a control circuit 20, and a CRT display unit 62. The CRT display unit 62 is commercially available as an external display device for a personal computer. It is inputted with five signals, that is, analog video signals R101, G102 and B103, a horizontal sync signal 104, and a vertical sync signal 105. The CRT display unit 62 is composed of a CRT display control circuit 60 and a CRT 61.

The analog video signals R101, G102 and B103 for driving the CRT display unit are delayed by the analog variable delay circuits 31 to 33, respectively. Then, the delayed signals are outputted to the CRT display control circuit 60. The CRT display control circuit 60 is inputted with the delayed video signals R131, G132 and B133, the horizontal sync signal 104, and the vertical sync signal 105, and enables the CRT 61 to display the corresponding image.

In this embodiment, the action and the adjusting operation of the analog variable delay circuits 31 to 33, the adjusting switch circuit 19, and the control circuit 20 are identical with those of the embodiment shown in FIG. 9. Hence, the description thereabout is left out. The analog variable delay circuits 31 to 33, the adjusting switch circuit 19, and the control circuit 20 may be located outside of the CRT display unit 62 or built therein.

In this embodiment, if the analog video signals R101, G102 and B103 outputted from the personal computer or the workstation contain skews among the Red, the Green and the Blue because of a variety of characteristics of the image output circuit and the transmission cable, the image display device enables to compensate those skews in respective colors. Hence, the resulting image on the CRT display unit contains less color blur.

Figure 16:
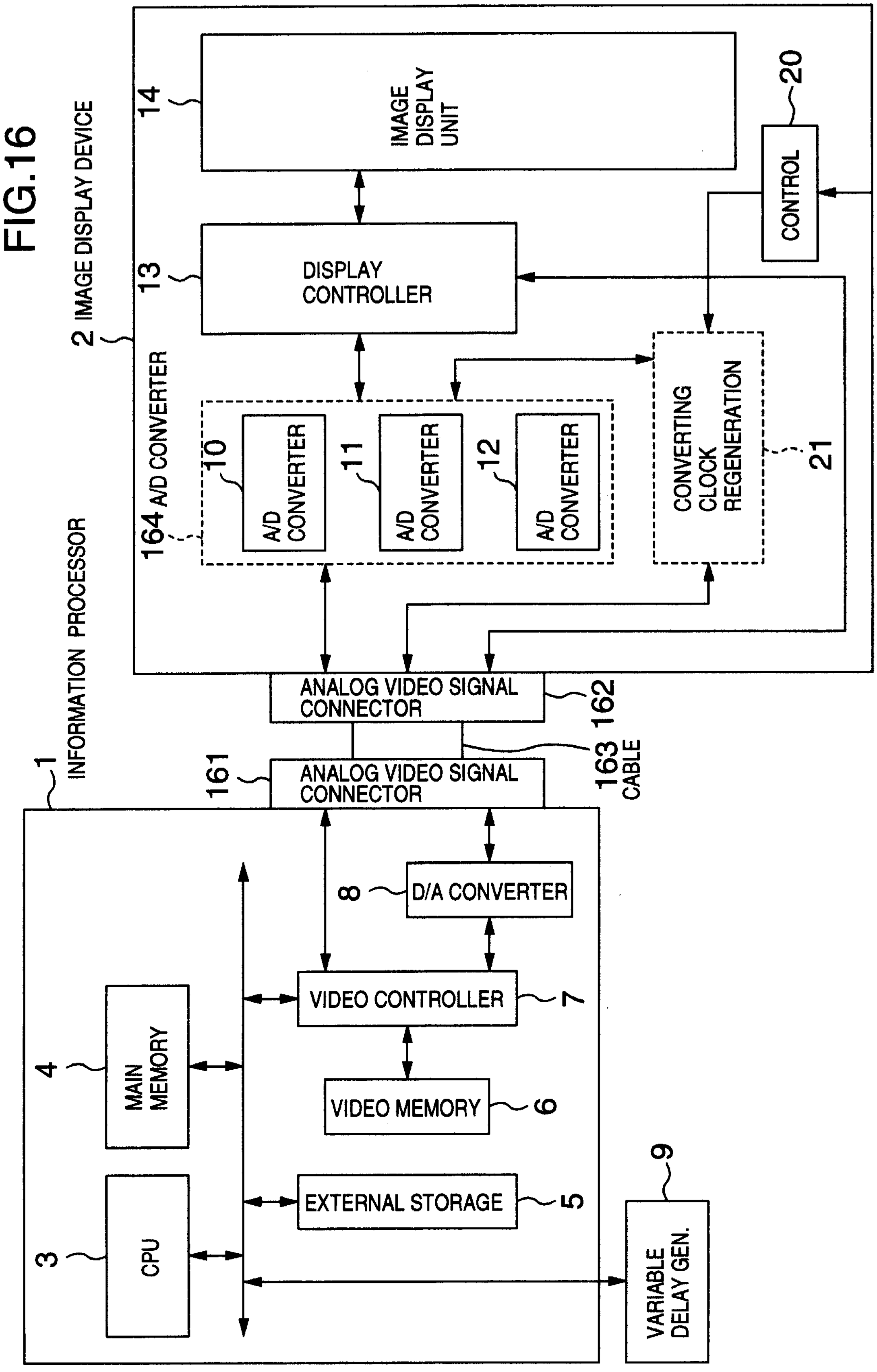
FIG. 16 is a circuit block diagram showing an embodiment of an information processing apparatus to which the present invention is applied.

In turn, the description will be oriented to an embodiment of an information processing apparatus to which the present invention applies with reference to FIG. 16. FIG. 16 shows the information processing apparatus provided with the image display device of the first embodiment shown in FIG. 1.

The main body 1 of the information processing apparatus shown in FIG. 16 includes a CPU 3, a main memory 4, a video controller 7, a video memory 6, a D/A converter 8, a variable delay generator 9 and an analog video signal connector 161. The CPU 3 operates to controls the operation of the information processing apparatus main body 1. The main memory 4 stores various programs and data for controlling the operation of the main body 1. The CPU 3 executes the programs stored in the main memory 4 and creates the image data to be transmitted to the image display unit 2 from indications entered from a keyboard and data stored in an external storage unit 5. The video controller 7 operates to control transmission of the video signals to the image display device 2. The video memory 6 stores the image data to be sent to the image display device 2. The D/A converter 8 is a circuit for converting the digital video signal outputted from the video controller 7 into an analog video signal. The analog video signal connector 161 is a connector through which an analog video signal is sent to the image display device 2 connected outside of the information processing apparatus itself.

The image display device receives the video signals R101, G102 and B103, the horizontal sync signal 104, and the vertical sync signal 105, the latter two of which are outputted from the video controller 7, through the video signal cable 163 and the analog video signal connector 162. The video signals R101, G102 and B103 are received by a group of A/D converter circuits 164. The horizontal sync signal is received by the converting clock regenerating circuit 21. The vertical sync signal 105 is received by the display control circuit 13. The internal arrangement of the image display device 2 is the same as that of the first embodiment shown in FIG. 1. Hence, the description thereabout is left out. In this embodiment, the image display device of the first embodiment shown in FIG. 1 is used in the information processing apparatus. In place, it goes without saying that the corresponding arrangement may be replaced with the arrangement shown in FIGS. 6, 9, 11, or 12.

As set forth above, according to the present invention, the image display device includes variable delay means for delaying color analog video signals in respective colors or clock variable delay means for delaying a dot clock for generating each color dot clock and supplying the color dot clock as a conversion timing signal of the corresponding color analog-to-digital converting means, so that the phase of each color analog video signal or the phase of the dot clock may be adjusted. Hence, the image display device arranged to convert the analog video signal into the digital video signal and display the image may suppress the color blur and improve the image quality even if the analog video signals contain skews among the primary colors.

What is claimed is:

1. An image display device arranged to receive analog video signals of plural colors and a synchronizing signal for controlling display of said video signals and display an image corresponding to said video signals, comprising:

an analog-to-digital converter circuit which converts said analog video signals of plural colors into digital video signals in respective colors;

a dot clock generating circuit which generates a dot clock serving as a conversion timing signal of said analog-to-digital converting circuit;

an image display circuit which is supplied with said digital video signals from said analog-to-digital converting circuit and displays the corresponding image to said digital video signals; and wherein said analog-to-digital converting circuit serves to adjust a sample timing in each color, on which the analog video signal of each color is converted into the digital video signal.

2. The image display device as claimed in claim 1, further comprising an each color clock generating circuit which distributes said dot clock in each color and generating each color dot clock, and wherein a sampling timing is adjusted by shifting a phase of each color dot clock outputted from said each color clock generating circuit and supplying the shifted phase to said analog-to-digital converting circuit.

3. The image display device as claimed in claim 2, wherein said dot clock generating circuit is served to distribute said synchronizing signal into a number of colors and then supply the distributed synchronizing signals into said each color clock generating circuit.

4. The image display device as claimed in claim 3, further comprising an adjusting switch which enters an indication of adjusting a phase of said each color dot clock into said each color clock generating circuit.

5. The image display device as claimed in claim 2, wherein said analog-to-digital converting circuit and said each color clock generating circuit are integrated on a simple integrated circuit.

6. The image display device as claimed in claim 2, further comprising a synchronizing signal adjusting circuit which adjusts a phase of said synchronizing signal and supplies said phase-adjusted synchronizing signal into said dot clock generating circuit.

7. The image display device as claimed in claim 1, further comprising a switch which enters an indication for adjusting a sampling timing.

8. The image display device as claimed in claim 1, further comprising an analog video signal varying circuit which adjusts a phase of said color analog video signal in each color and supplies said phase-adjusted video signals into said analog-to-digital converting circuit, and wherein a sampling timing is adjusted by shifting the phase of said analog video signals.

9. The image display device as claimed in claim 8, further comprising an adjusting switch which enters an indication of adjusting a phase of said analog video signals into said analog video signal varying circuit.

10. The image display device as claimed in claim 8, wherein an analog video signal varying circuit and said analog-to-digital converting circuit are integrated on a simple circuit.

11. An image display device arranged to receive analog video signals of plural colors and a synchronizing signal used for controlling display of said video signals and to display the corresponding image to said video signals, comprising:

an analog-to-digital converting circuit which converts analog video signals of plural colors into digital video signals, respectively;

a dot clock generating circuit which generates a dot clock serving as a conversion timing signal of said analog-to-digital converting circuit;

an analog video signal varying circuit which adjusts a phase of said analog video signal of each color and supplies said phase-adjusted analog video signals to said analog-to-digital converting circuit; and wherein said image display device operates to display the image corresponding to the digital video signals outputted from said analog-to-digital converting circuit.

12. The image display device as claimed in claim 11, wherein said dot clock generating circuit operates to generate said dot clock in response to said synchronizing signal.

13. The image display device as claimed in claim 11, further comprising an adjusting switch which enters an indication of adjusting the phase of said analog video signals into said analog video signal varying circuit.

14. The image display device as claimed in claim 11, wherein said analog video signal varying circuit and said analog-to-digital converting circuit are integrated on a single circuit.

15. An image display device arranged to receive analog video signals of plural colors and a synchronizing signal for controlling display of said video signals and to display the corresponding image to said video signals, comprising:

an analog-to-digital converting circuit which converts said analog video signals of plural colors into digital video signals, respectively;

a dot clock generating circuit which generates a dot clock serving as a conversion timing signal of said analog-to-digital converting circuit;

each color clock generating circuit which distributes said dot clock, generating each color dot clock, and supplies said each color dot clock to said analog-to-digital converting circuit of each color as a proper conversion timing signal; and wherein said image display device operates to receive the digital video signals outputted from said analog-to-digital converting circuit and display the corresponding image to said digital video signals.

16. The image display device as claimed in claim 15, wherein said dot clock generating circuit is supplied with said synchronizing signal and generates said dot clock based on said synchronizing signal.

17. The image display device as claimed in claim 15, further comprising an adjusting switch which enters an indication of adjusting a phase of said each color dot clock to said each color clock generating circuit.

18. The image display device as claimed in claim 15, wherein said analog-to-digital converting circuit and said each color clock generating circuit are integrated on a single circuit.

19. The image display device as claimed in claim 15, further comprising a synchronizing signal adjusting circuit which adjusts a phase of said synchronous signal and supplies said phase-adjusted signal to said dot clock generating circuit.

20. An image display device arranged to receive analog video signals of plural colors and a synchronizing signal for controlling display of said video signals and display the corresponding image to said analog video signals, comprising:

an analog video signal varying circuit which adjusts a phase of said analog video signal of each color;

a display control circuit which receives analog video signals outputted from said analog varying circuit and said synchronizing signal and controls the display according to said synchronizing signal; and an image display unit which displays an image under the control of said display control circuit.

21. The image display device as claimed in claim 20, further comprising an adjusting switch which enters an indication of adjusting a phase of said analog video signals into said analog video signal varying circuit.

22. An information processing apparatus comprising:

a memory which stores display data;

a digital-to-analog converting circuit which converts said display data stored in said memory, for generating analog video signals of plural colors;

a control circuit which outputs a synchronizing signal used for displaying said display data;

one or more signal lines which convey said synchronizing signal and said analog video signals of plural colors;

an analog-to-digital converting circuit which converts said analog video signals of plural colors received through said signal lines into digital video signals of plural colors, respectively;

a dot clock generating circuit which is supplied with said synchronizing signal from said signal lines and generates a dot clock serving as a conversion timing signal of said analog-to-digital converting circuit;

each color clock generating circuit which distributes said dot clock, generates each color dot clock, and supplies said each color dot clock to said analog-to-digital converting circuit for each color as its proper conversion timing signal; and an image display circuit which is supplied with the digital video signals outputted from said analog-to-digital converting circuit and displays the corresponding image to said digital video signals.

23. An information processing apparatus comprising:

a memory which stores display data;

a digital-to-analog converting circuit which converts said display data stored in said memory into analog video signals of plural colors;

a control circuit which outputs a synchronizing signal used for displaying said display data;

one or more signal lines which conveys said synchronizing signal and said analog video signals of plural colors;

an analog video signal varying circuit which is supplied with said analog video signals of plural colors from said signal lines, adjusts a phase of said analog video signals of plural colors in respective colors, and outputs said phase-adjusted analog video signals;

a dot clock generating circuit which is supplied with said synchronizing signal from said signal lines and generates a dot clock;

an analog-to-digital converting circuit which converts said analog video signals of plural colors received from said analog video signal varying circuit into digital video signals in respective colors according to said dot clock, said dot clock serving as a conversion timing signal of said analog-to-digital converting circuit; and an image display circuit which is supplied with the digital video signals outputted from said analog-to-digital converting circuit and displays the corresponding image to said digital video signals.

24. An information processing apparatus comprising:

a memory which stores display data;

a digital-to-analog converting circuit which converts said display data stored in said memory into analog video signals of plural colors;

a control circuit which outputs a synchronizing signal used for displaying said display data;

one or more signal lines which conveys said synchronizing signal and said analog video signals of plural colors;

an analog video signal varying circuit which adjusts a phase of said analog video signal of each color;

a display control circuit which is supplied with analog video signals outputted from said analog video signal varying circuit and said synchronizing signal and controlling display according to said synchronizing signal; and an image display unit which displays an image under the control of said display control circuit.

* * * * *